US012422121B2

(12) United States Patent
Colombel et al.

(10) Patent No.: US 12,422,121 B2
(45) Date of Patent: Sep. 23, 2025

(54) OPTICAL ELEMENT AND LIGHT MODULE OF A MOTOR VEHICLE EQUIPPED WITH SUCH AN OPTICAL ELEMENT

(71) Applicant: VALEO VISION, Bobigny (FR)

(72) Inventors: Jean-Marc Colombel, Bobigny (FR); Antonin Barrau, Bobigny (FR)

(73) Assignee: Valeo Vision, Bobigny (FR)

( * ) Notice: Subject to any disclaimer, the term of this patent is extended or adjusted under 35 U.S.C. 154(b) by 175 days.

(21) Appl. No.: 17/779,441

(22) PCT Filed: Nov. 23, 2020

(86) PCT No.: PCT/EP2020/083059
§ 371 (c)(1),
(2) Date: May 24, 2022

(87) PCT Pub. No.: WO2021/105058
PCT Pub. Date: Jun. 3, 2021

(65) Prior Publication Data

US 2022/0403996 A1 Dec. 22, 2022

(30) Foreign Application Priority Data

Nov. 28, 2019 (FR) .................................... 1913370

(51) Int. Cl.
*F21S 41/32* (2018.01)

(52) U.S. Cl.
CPC .................................... *F21S 41/32* (2018.01)

(58) Field of Classification Search
CPC .................................................... F21S 41/32
See application file for complete search history.

(56) References Cited

U.S. PATENT DOCUMENTS 8,646,955 B2 * 2/2014 Okubo ................. F21S 41/143
362/512
9,970,618 B2 5/2018 Zawacki
10,260,728 B2 4/2019 Cholley
(Continued)

FOREIGN PATENT DOCUMENTS

CN 203413508 U 1/2014
CN 107339654 A 11/2017
(Continued)

OTHER PUBLICATIONS

European Patent Office, International Search Report (with English translation) and Written Opinion of International Application No. PCT/EP2020/083059, dated Feb. 4, 2021.
(Continued)

*Primary Examiner* — Thomas M Sember
(74) *Attorney, Agent, or Firm* — Valeo Vision

(57) ABSTRACT

The present invention relates to an optical element of a vehicle light module, the light module including at least one light source, the rays emitted from which pass through a transparent optical surface of the optical element and emerge in the form of a light beam, the transparent optical surface extending mainly along a transverse axis between a first transverse end and a second transverse end, with the optical element including at least one means for attachment to the light module at each of the transverse ends of the transparent optical surface.

16 Claims, 8 Drawing Sheets

(56) References Cited

U.S. PATENT DOCUMENTS

| | | | | |
|---|---|---|---|---|
| 2010/0165653 | A1* | 7/2010 | Ookubo ................ | F21S 41/155 362/539 |
| 2014/0321145 | A1* | 10/2014 | Anzai .................. | F21S 41/295 362/516 |
| 2017/0291532 | A1 | 10/2017 | Dinant et al. | |
| 2019/0162380 | A1 | 5/2019 | Garin et al. | |

FOREIGN PATENT DOCUMENTS

| | | | |
|---|---|---|---|
| CN | 107345640 | A | 11/2017 |
| EP | 2202459 | A1 | 6/2010 |
| EP | 2796772 | A2 | 10/2014 |
| EP | 3260764 | A1 | 12/2017 |
| EP | 3366984 | A1 | 8/2018 |
| EP | 3489576 | A1 | 5/2019 |
| JP | 2016173908 | A | 9/2016 |

OTHER PUBLICATIONS

China Patent Office, Office Action of corresponding Chinese Patent Application No. 202080082551.0, dated Jan. 11, 2024.

* cited by examiner

OPTICAL ELEMENT AND LIGHT MODULE OF A MOTOR VEHICLE EQUIPPED WITH SUCH AN OPTICAL ELEMENT

CROSS-REFERENCE TO RELATED APPLICATIONS

This application is filed under 35 U.S.C. § 371 U.S. National Phase of International Application No. PCT/EP2020/083059 filed Nov. 23, 2020 (published as WO2021105058), which claims priority benefit to French application No. 1913370 filed on Nov. 28, 2019, the disclosures of which are herein incorporated by reference in their entirety.

TECHNICAL FIELD

The present invention relates to the field of lighting and/or of light-based signaling in the motor vehicle field, and more particularly to light modules configured for performing this function of lighting and/or signaling.

BACKGROUND OF THE INVENTION

The field of lighting and/or of light-based signaling in motor vehicles is subject to regulations which dictate that each motor vehicle must be equipped with lights performing specific safety functions, and notably with high-beam and low-beam headlamps. Low-beam headlamps allow a motor vehicle to be seen by other road users and allow its driver to see the roadway properly out to a distance of 30 meters, without dazzling other users in the roadway setting. High-beam headlamps emit more intense beams of light so that the driver of the motor vehicle can see the roadway properly out to a distance of 100 meters, under nighttime conditions.

It is known that low-beam headlamps and high-beam headlamps are, respectively, provided by means of a light module, where each light module may comprise a light source which is essentially a point source, of the light-emitting diode type for example, and a reflector, comprising a reflective surface of revolution with an elliptical profile, while the light module may additionally comprise a support acting as an attachment reference frame for the source and the reflector. The light source is then located at a first focal point of the reflective surface, being orientated so as to emit light essentially in the direction of said reflective surface. The light rays are reflected in a convergent manner toward a second focal point of the reflective surface of the collector, coinciding with a focal point of an optical element of the light module, such as a lens, configured for projecting a light beam reflected by the reflector towards the roadway. The light module comprises a protective cover for preventing any leakage of light rays out of the light module other than through the optical element.

BRIEF SUMMARY OF THE INVENTION

The optical element is generally elongate in shape and substantially rectangular, thus having two sides which are longer than the other two sides. The longer sides are oriented principally parallel to the roadway, so as to advantageously project the light beam of the light module over the width of the roadway, while avoiding dazzling the drivers of other vehicles.

It is known for the optical element to be integral with the support and/or the protective cover, notably in order to fix the position of the latter and thus to make the focal point of the optical element continue to coincide with the second focal point of the reflector, so as to ensure that the beam emitted by the optical element is correctly projected onto the roadway. Notably, it is known for the support and/or the protective cover of the light module to be integral with the optical element on the longer sides of the optical element.

This attachment of the optical element to the support and/or to the protective cover on its longer sides causes the formation of areas without light activity on the optical element. Indeed, it should be noted that the areas of attachment of the optical element to the support and/or the protective cover consist of opaque areas which prevent the light rays emitted by the light source from traveling toward the roadway. These areas of attachment of the optical element thus decrease the active area through which the light rays pass through the optical element, reducing the optical efficiency of the light module. The presence of these areas of attachment also results in an increase in the overall dimensions of the light module on each longer side, which tends to detract from the visual effect that the use of an elongate optical element, or thin lens, is intended to provide.

In this context, the present invention proposes an alternative to the existing solutions of attaching an optical element to a support and/or protective cover of a light module, which enables said light module to have an active optical area, that is to say an area of maximum size through which the light rays emitted by the light module pass through the optical element.

Thus, a first aspect of the present invention is an optical element of a vehicle light module, the light module comprising at least one light source, the rays emitted from which pass through a transparent optical surface of the optical element and emerge in the form of a light beam, the transparent optical surface extending mainly along a transverse axis between a first transverse end and a second transverse end, characterized in that the optical element comprises at least one means for attachment to the light module at each of the transverse ends of the transparent optical surface.

In other words, the optical element to which the invention relates comprises, on the one hand, the transparent optical surface, which may be considered to be a projection lens of the module, configured for shaping the light rays emitted by the light source into a light beam according to the regulations to be projected onto the roadway, and, on the other hand, laterally positioned attachment means which enable the transparent optical surface to be positioned facing the path of the rays emitted by the light source. The transparent optical surface, that is to say the projection lens of the module, is of elongate shape, having a principal direction which is transverse in this case. In a front view, the transparent optical surface is thus of substantially rectangular shape, with the longer sides arranged transversely. The lateral attachment means are arranged on either side of the transparent optical surface, at the transverse ends of this transparent optical surface, enabling the transparent optical surface to be attached laterally to a structuring element of the light module.

It should be noted that only the transverse ends of the transparent optical surface contribute to the attachment of the latter to a structuring element, and notably to a support of the light source and of the reflector. It is to be understood that the attachment means are not present on the other edges of the transparent optical surface, thus leaving the transparent optical surface disengaged, notably, on its longer transverse sides, thereby maximizing the useful optical surface, that is to say the optical surface that is not masked by the attachment means.

According to an optional feature of the invention, the attachment means is an attachment lug extending substantially perpendicularly to the transparent optical surface along a longitudinal axis.

The transparent optical surface is advantageously positioned perpendicularly to the optical axis of the light module, that is to say the main direction of movement of the emitted rays, so that it can shape these rays into a beam projected onto the roadway, and the attachment lugs therefore extend substantially parallel to the optical axis between the light source or sources and the transparent optical surface, or between the reflector and the transparent optical surface, as the case may be. Thus the attachment lugs of the transparent optical surface may be arranged laterally without interfering with the propagation of the light rays toward this transparent optical surface.

Each attachment lug has a substantially flat shape, that is to say a shape in which one dimension, in this case the thickness along the transverse dimension, is smaller than the other two dimensions, and notably smaller than the aforementioned longitudinal dimension. The small thickness along the transverse dimension makes it possible to minimize the opaque area that may be visible, as a result of transparency, to an external observer facing the transparent optical surface.

According to another optional feature of the invention, the attachment means of the optical element and the transparent optical surface of the optical element form a one-piece unit.

The unit is described as one-piece because its components, namely the transparent optical surface and the attachment means, cannot be dissociated from each other; that is to say, these components cannot be separated without causing at least one of the components to be damaged or destroyed. In other words, the optical element comprising the transparent optical surface and attachment lugs is made in one piece, in a single unit formed of a single material. Each component of the optical element thus consists of the same basic material, with fillers added at some points if necessary, so that the attachment lugs are made of a transparent or translucent material without having any optical function.

The invention also relates to a light module comprising an optical element as described above, the light module comprising the at least one light source, the beams emitted from which pass through the transparent optical surface of the optical element and emerge in the form of a light beam.

According to an optional feature of the invention, the light module comprises at least one support for the at least one light source and for the optical element, the support having a housing for each attachment means of the optical element.

Each housing, formed specially in the support for receiving one attachment lug of the optical element, contributes to the positioning and the attachment of the optical element with respect to the support.

According to another optional feature of the invention, the attachment means being, as mentioned previously, an attachment lug extending substantially along the longitudinal axis, the attachment lug comprises at least one positioning block of the optical element capable of interacting with a groove formed in a wall of the housing to secure the position of the optical element with respect to the support along the longitudinal axis, and/or at least one positioning stud of the optical element capable of bearing on a wall of the housing to form an abutment for the vertical positioning of the optical element with respect to the support along a vertical axis perpendicular to the longitudinal axis and to the transverse axis.

Each positioning block and each positioning stud is configured for interaction with a positioning member formed on, or by, a wall of the support, to enable the optical element to be positioned with respect to this support. By being housed in, or positioned against, this positioning member, each positioning means carried by the attachment lug enables the optical element to be placed in position, and kept in position where necessary, along a specific axis.

More particularly, the positioning block and the complementary positioning member are configured for keeping the optical element, and therefore the transparent optical surface, in position with respect to the longitudinal axis. The positioning stud and its complementary positioning member, that is to say a wall against which the stud comes to bear, are configured for providing a vertical positioning abutment for the attachment lug, while the position in this direction is also maintained by the gripping of the attachment lug between the support and a reflector of the light module, or between the support and a protective cover of the light module, as described below.

The positioning block of the optical element and the positioning groove of the housing are configured, notably by their shapes and dimensions, for positioning the optical element with respect to the support along the longitudinal axis, the positioning block being capable of being partially housed in the groove, the faces of the block being in contact with, or in the vicinity of, the walls that longitudinally delimit the housing.

According to another optional feature of the invention, the at least one positioning block of the optical element and the at least one positioning stud are formed on the same face of the attachment lug.

According to another optional feature of the invention, each attachment lug comprises an inner face positioned to face the other attachment lug, that is to say toward the inside of the light module; an outer face that is opposed, that is to say oriented toward the outside of the light module; and an upper face and a lower face connecting the inner and outer faces, the lower face being positioned facing a bottom wall of the corresponding housing; the module being characterized in that the at least one positioning block of the optical element and the least one positioning stud are formed on the lower face of the attachment lug, the groove being capable of interacting with the bottom wall of the housing.

Thus the attachment lug advantageously comprises four faces, the attachment lug advantageously extending in the form of a right parallelepiped.

The lower face of this right parallelepiped is substantially perpendicular to the inner face and to the outer face, and corresponds to the face which is made to face the support of the light module, forming a frame of reference for the attachment of the light source. In an opposite manner, the upper face of this right parallelepiped corresponds to the face which is made to face the protective cover of the light module that covers, notably, the transparent optical surface.

At least one lower face of an attachment lug comprises positioning means for positioning the optical element along at least two specified axes. More particularly, these positioning means may be positioning blocks configured for positioning the optical element with respect to the support along a longitudinal axis, that is to say the main axis of elongation of the attachment lugs, or may be positioning studs configured for positioning the optical element with respect to the support along another axis, by bearing on the support of the light module.

According to another optional feature of the invention, the housing is delimited transversely by a longitudinal wall and an inner wall which project from the support, the light module being characterized in that the outer face and/or the inner face of the attachment lug comprise at least one positioning rib for positioning with respect to the support, which rib can bear on one of the walls delimiting the corresponding housing to position the optical element with respect to the support along the transverse axis.

These positioning ribs enable the optical element to be positioned along the transverse axis, and enable this position to be fixed, by providing precise guidance for the attachment lugs into an appropriate housing of the support. It should be noted that the precise guidance is provided by the contact of the positioning ribs with the walls transversely delimiting the housing.

According to another optional feature of the invention, the optical element is positioned so as to be cantilevered from the support of the light module.

More particularly, the support has a transverse edge that extends longitudinally from one housing to the other. Each housing is longitudinally delimited by this transverse edge. In this context, the attachment lugs adapted to interact with a housing for positioning and attaching the optical element on the support comprise a part located inside the housing and a part extending longitudinally outside this housing, beyond the transverse edge. The transparent optical surface, extending transversely between these attachment lugs positioned beyond the transverse edge, thus extends in cantilever fashion, that is to say without being supported by the support. In other words, the transparent optical surface, or the projection lens of the module, may also be described as floating.

According to another optional feature of the invention, the module further comprises a reflector attached to the support to deflect the light rays emitted by the light source toward the optical element, said reflector being positioned to overlap means for covering the attachment lugs of the optical element which are positioned, respectively, in a housing of the support.

According to another optional feature of the invention, the reflector comprises at least one elastically deformable tab in contact with one of the attachment means of the optical element, so as to immobilize said attachment means in the corresponding housing along the vertical axis.

The elastically deformable tabs of the reflector comprise a bearing wall that bears on the attachment lugs to keep them in their housings by blocking them along the vertical axis. Furthermore, the elastically deformable tabs tend to push the attachment lugs toward the bottoms of their respective housings, so that the positioning studs of the attachment lugs bear on the support in the bottoms of their respective housings, thus immobilizing the optical element along the vertical axis.

According to another optional feature of the invention, the light module further comprises a protective cover configured to be attached to the support so as to surround at least the reflector and the attachment means of the optical element, the reflector comprising at least one positioning spur configured to interact with a wall of the protective cover, and/or the protective cover comprises at least one retaining rib configured to interact with a wall of the reflector.

According to another optional feature of the invention, the protective cover comprises an upper wall extending in a first plane parallel to the longitudinal axis and to the transverse axis, and a lower wall extending in a second plane parallel to the longitudinal axis and to the transverse axis, the upper wall and the lower wall being connected to each other by longitudinal walls, the protective cover comprising a front wall arranged at a longitudinal end of the upper wall, of the lower wall and of the transverse walls, said front wall comprising an opening, the opening being designed to receive the transparent optical surface of the optical element, the upper wall having, toward the inside of the light module, the at least one retaining rib interacting with the positioning spur of the reflector.

When the protective cover is mounted on the light module, the ribs of the protective cover come to bear on the positioning studs of the reflector. As a result of this interaction, a linear contact is formed between the cover and the reflector, and precise positioning of the protective cover along the vertical axis is provided, so that the transparent optical surface is correctly arranged in the opening formed in the front wall of the protective cover. Also as a result of this interaction, a secure contact can be provided between the protective cover and the reflector.

It should be noted that the longer transverse sides of the transparent optical surface of the optical element are edges arranged so that one faces the support and the other faces one surface of the protective cover facing the support, the transparent optical surface being capable, owing to its lateral attachment means, of being kept gripped between the support and the protective cover.

According to another optional feature of the invention, the protective cover comprises a lower fastening tab extending one edge of the lower wall of the protective cover, and at least one upper fastening tab extending one edge of the upper wall of the protective cover, each tab having an aperture configured to interact with an attachment means formed on the support of the light module. Each fastening tab can be elastically deformed to form means for attaching the cover to the support by snap-fitting.

According to another optional feature of the invention, the fastening tabs are formed so as to project from the lower wall and the upper wall, so that these walls are longitudinally extended in the opposite direction from the transparent optical surface.

The protective cover is mounted on the light module by positioning the fastening tabs vertically on either side of the transparent optical surface, and then by causing the protective cover to be translated along the longitudinal axis, so that the protective cover forms a cap for the light module.

Thus the protective cover is attached by snap-fitting in the opposite direction from the transparent optical surface.

According to another optional feature of the invention, the support comprises at least one guide rib for guiding the lower fastening tab.

The guide rib guides the fastening tabs when the protective cover is mounted on the support, by guiding the fastening tabs together with the protective cover toward an attachment means formed on the support.

BRIEF DESCRIPTION OF THE DRAWINGS

Other features, details and advantages of the invention will be more fully apparent from a reading of the following description on the one hand, and on the other hand a number of examples of embodiment provided for guidance in a non-limiting way, with reference to the attached drawings, in which.

DETAILED DESCRIPTION OF THE INVENTION

The features, variants and different embodiments of the invention may be combined with one another, in various combinations, as long as they are not mutually incompatible or mutually exclusive. In particular, variants of the invention can be contemplated that only comprise a selection of features that are described hereafter independently of the other described features, if this selection of features is sufficient to provide a technical advantage and/or to differentiate the invention from the prior art.

Figure 1:
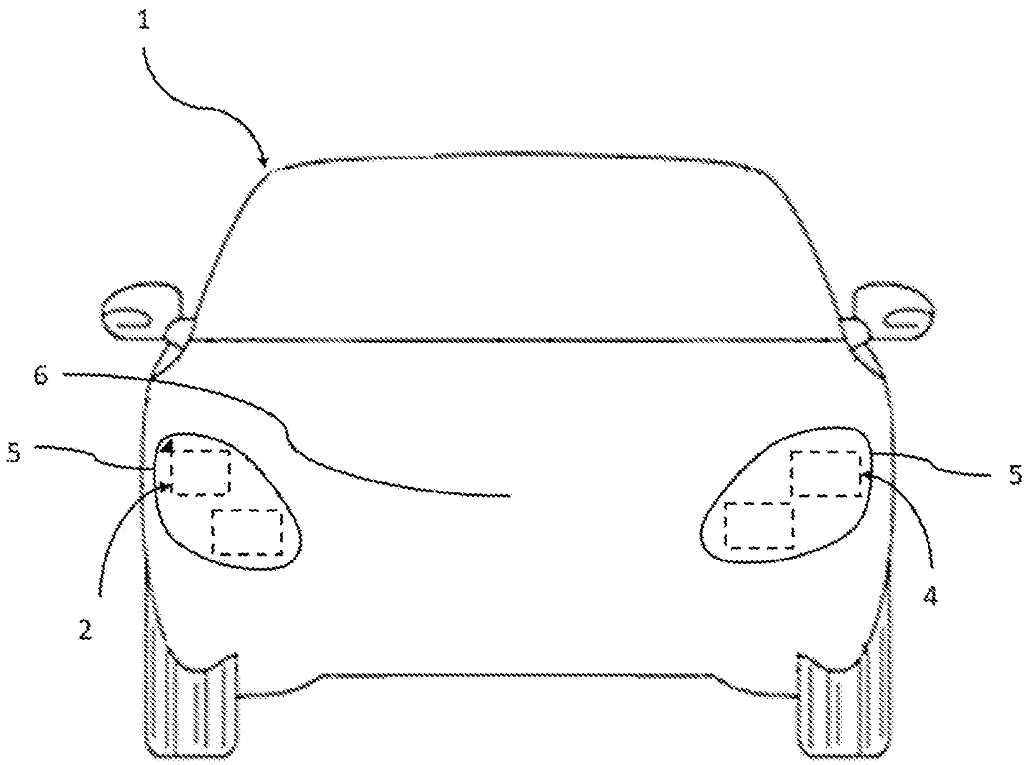
FIG. 1 is a front view of an vehicle equipped with two light modules according to the invention.

With reference to FIG. 1, a vehicle 1 is equipped with a first light module 2, and advantageously at least a second light module 4, placed in a headlamp 5. The light modules 2 and 4 are used, for example, for the lighting and/or light-based signaling of the vehicle 1, by projecting a light beam toward the roadway, which is not shown in any of the figures, and on which the vehicle 1 is placed. The light modules 2 and 4 are mounted at the front and/or at the rear of the vehicle 1, and, in the illustrated example, on the front face 6 of the vehicle 1.

The first light module 2 and the second light module 4 are symmetrical with each other about a mid-plane of the vehicle 1. Thus the following description of the first light module 2 may equally well refer to the second light module 4.

Figure 2:
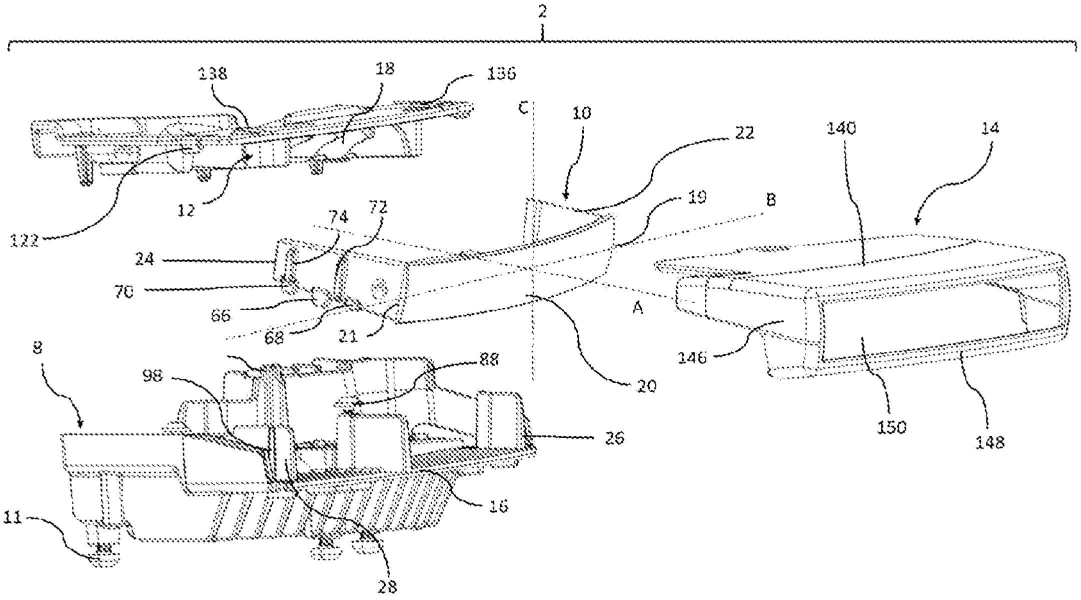
FIG. 2 is an exploded view of a light module comprising a support, a reflector, a protective cover and an optical element having a transparent optical surface and two lateral lugs for attachment to the support.

As shown in FIG. 2, the first light module 2, also called the light module 2, comprises a support 8, on which an optical element 10 and a reflector 12 are positioned, a protective cover 14 being positioned around the lighting unit formed by the support 8, the optical element 10 and the reflector 12. The detailed description of each of the elements of the light module 2 will be given after the brief description of the various aforesaid elements which follows.

Firstly, the light module 2 can be integrated into a structure of the vehicle, or into a headlamp casing 5 shown in FIG. 1 and incorporating one or more light modules, notably by means of a plurality of clamping screws 11 of the support 8, these screws being capable, in this case, of interacting with tapped barrels projecting from the lower wall 16 of the support 8. The support 8 is an element of the light module 2 to which at least one light source, not visible in FIG. 2, is attached, said light source being capable of emitting light rays toward the reflector 12. More particularly, the light rays emitted by the light source or sources are directed toward a reflective surface 18, having an elliptical profile in this case, of the reflector 12, this reflective surface 18 reorienting the light rays toward the output of the light module, in a longitudinal main direction of transmission, parallel to a longitudinal axis A.

The optical element 10 is arranged on the support 8 so that it is lies across these light rays reoriented by the reflective surface 18 of the reflector 12. More particularly, the optical element 10 comprises a transparent optical surface 20 of this optical element arranged across the rays. The transparent optical surface 20 extends mainly along a transverse axis B between a first transverse end 19 and a second transverse end 21.

To enable an appropriate beam to be projected at the output of the light module, the reflective surface 18 of the reflector 12 may be positioned on the support 8 so that the light source coincides or substantially coincides with the first focal point of the elliptical reflective surface 18 and the second focal point of the elliptical reflective surface 18 coincides or substantially coincides with the primary focal point of the transparent optical surface 20. Other arrangements could be used without departing from the context of the invention, for example by having the focal point of the projection lens, that is to say the transparent optical surface of the optical element, located at the reflective surface.

According to the invention, the optical element 10 comprises at least one lateral attachment means at each of the transverse ends 19, 21 of the transparent optical surface 20. As shown in FIG. 2, showing, the lateral attachment means here takes the form of attachment lugs, extending substantially perpendicularly to the transparent optical surface 20 along the longitudinal axis A. Thus the transparent optical surface 20 is extended at the first transverse end 19 by the first attachment lug 22, and at the second transverse end 21 by the second attachment lug 24.

The attachment lugs 22, 24 of the optical element 10 represent the members by means of which the optical element 10 is fixed to the support 8, the latter having a housing of appropriate shape and dimensions for receiving each of the attachment lugs 22, 24 of the optical element 10. Thus the first attachment lug 22 is housed in a first housing 26 and the second attachment lug is housed in a second housing 28.

The protective cover 14 is attached to the support in such a way that both the optical element and the reflector are clamped between the cover and the support. This protective cover comprises an upper protective wall 140 and a lower protective wall which is not visible in FIG. 2, the upper protective wall 140 and the lower protective wall being joined to each other by longitudinal protective walls. The protective cover 14 comprises at least one front wall 148 extending mainly along the transverse axis B, which interconnects the first terminal edges, that is to say the terminal edges facing the outside of the module and of the vehicle, of the opaque walls.

This front wall 148 has an opening 150 formed over almost the whole of said wall, the front wall then being a frame of substantially rectangular shape. The protective cover 14 is positioned so that the opening 150 of the front wall 148 is arranged around the transparent optical surface 20 of the optical element 10. Thus the protective cover 14 enables each of the components of the light module to be retained with respect to the others, notably with respect to the support, while allowing a light beam to be projected out from the light module 2 by the optical element 10 through the opening 150. The protective cover 14 also prevents the leakage of light rays at the periphery of the transparent optical surface 20.

Other features, details and advantages of the protective cover 14, of the reflector 12 and of the support 8 will be described after the following detailed description of the optical element 10.

Figure 3:
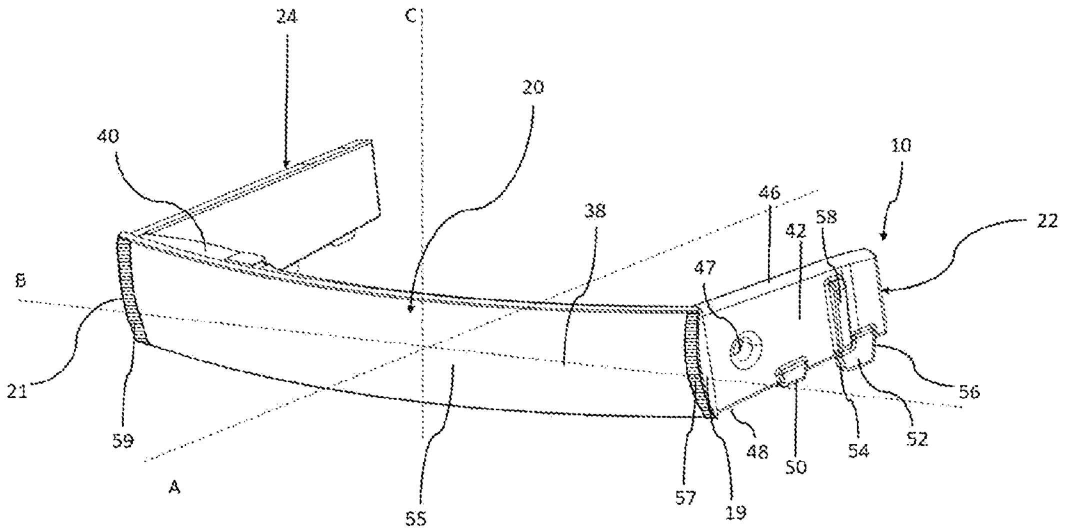
FIG. 3 is a perspective view of the optical element of FIG. 2.

The transparent optical surface 20 here takes the form of a flat projection lens whose thickness, measured along the longitudinal axis A, is minimal relative to its dimensions along the main transverse axis of extension B and a vertical axis C, the vertical axis C being perpendicular to the longitudinal axis A and to the transverse axis B. Without being limiting on the invention, the transparent optical surface 20 here has a substantially curved shape, as shown in FIG. 3.

The thickness of the transparent optical surface is substantially constant over a first portion 38 of the transverse optical surface 20, similar to a thin lens extending from the first transverse end 19. The thickness of the first portion 38 is, for example, less than or equal to 4 mm. At the second transverse end 21, a second portion 40 of the transparent optical surface 20 has a greater thickness than the thickness of the aforementioned first portion 38. The thickness of the second portion 40 is, for example, greater than or equal to 6 mm. This configuration of the transparent optical surface with two different thicknesses makes it possible to perform two different optical functions with the same transparent optical surface, and notably to provide an area for emitting a first type of light beam, for example a low-beam light, and an area for emitting a second type of light beam, for example a high-beam light.

As stated above, the first attachment lug 22 extends perpendicularly to the transparent optical surface 20 at the first transverse end 19. The first attachment lug has a first outer face 42 and a first inner face directed toward the other attachment lug and not visible in FIG. 3, together with a first upper face 46 and a first lower face 48 which join the inner and outer faces of the lug to each other.

The first attachment lug 22 has a hole 47 formed in the first outer face 42, which may be a through hole which therefore opens on the first inner face, for use, notably, during the mounting of the light module 2. This hole 47 may, notably, receive the gripping finger of a mounting tool.

The first attachment lug 22 comprises at least one means for positioning the optical element 10 with respect to the support, for each of the axes defined above.

More particularly, the first attachment lug 22 has a first positioning stud 50 for positioning the optical element 10 with respect to the support along the vertical axis C. The first positioning stud 50 extends as a vertical extension of the first attachment lug 22, at the junction of the first outer face 42 and the first lower face 48. The transverse dimension of the first positioning stud 50 represents about 10% to 20% of the corresponding longitudinal dimension of the first attachment lug 22, and the vertical dimension of the first positioning stud 50 represents about 20% to 30% of the corresponding vertical dimension of the first attachment lug 22.

The first positioning stud 50 is designed to bear on the support 8, and more precisely in the first housing 26. The fact that the first positioning stud 50 bears on the support 8 makes it possible to secure the position of the optical element 10 along the vertical axis C.

The first attachment lug 22 also has a first positioning block 52 for positioning the optical element 10 with respect to the support along the longitudinal axis A. The first positioning block 52 also extends in the vertical extension of the first attachment lug 22, at the junction of the first outer face 42 and the first lower face 48. The longitudinal dimension of the first positioning block 52 represents about 10% to 20% of the corresponding longitudinal dimension of the attachment lug, in a similar way to the first positioning stud 50. However, the vertical dimension of the first positioning block 52 represents about 35% to 45% of the transverse dimension of the attachment lug, the vertical dimension of the first positioning block 52 thus being greater than the vertical dimension of the first positioning stud 50.

The first positioning block 52 has a first bearing face 54 and a second bearing face 56 extending mainly in a plane perpendicular to the longitudinal axis A. The first positioning block 52 is intended to be housed in a groove formed in the first housing 26 of the support 8, and the first and second bearing faces 54, 56 of said block 52 form abutment walls for the longitudinal displacement of the first positioning block in the groove, so that they enable the position of the optical element 10 to be positioned and secured along the longitudinal axis A.

The first attachment lug 22 also comprises a first positioning rib 58 for positioning the optical element along the transverse axis B. The first positioning rib 58 extends on the first outer face 42 of the first attachment lug 22 along the vertical axis C, extending over most of the height of the first attachment lug 22. The first positioning rib forms a transverse projection from the first attachment lug, and it should be noted that the transverse dimension of this first positioning rib, that is to say the transverse dimension of the projection formed by the first positioning rib, is greater than the corresponding transverse dimension of the first positioning block or of the first positioning stud 50 and of the first positioning block 52.

The first positioning rib 58 is designed to bear on one of the walls that transversely delimit the first housing 26 of the support 8. The fact that the first positioning rib 58 bears on one of the walls of the first housing 26 makes it possible to position and secure the position of the optical element 10 along the transverse axis C.

It should be noted that the arrangement of the positioning means shown in FIG. 3, with the first positioning rib 58 positioned longitudinally between the first positioning block 52 and the first positioning stud 50, is not limiting on the invention, and could be modified, provided that the corresponding means formed in the first housing of the support are arranged in a corresponding order.

Figure 4:
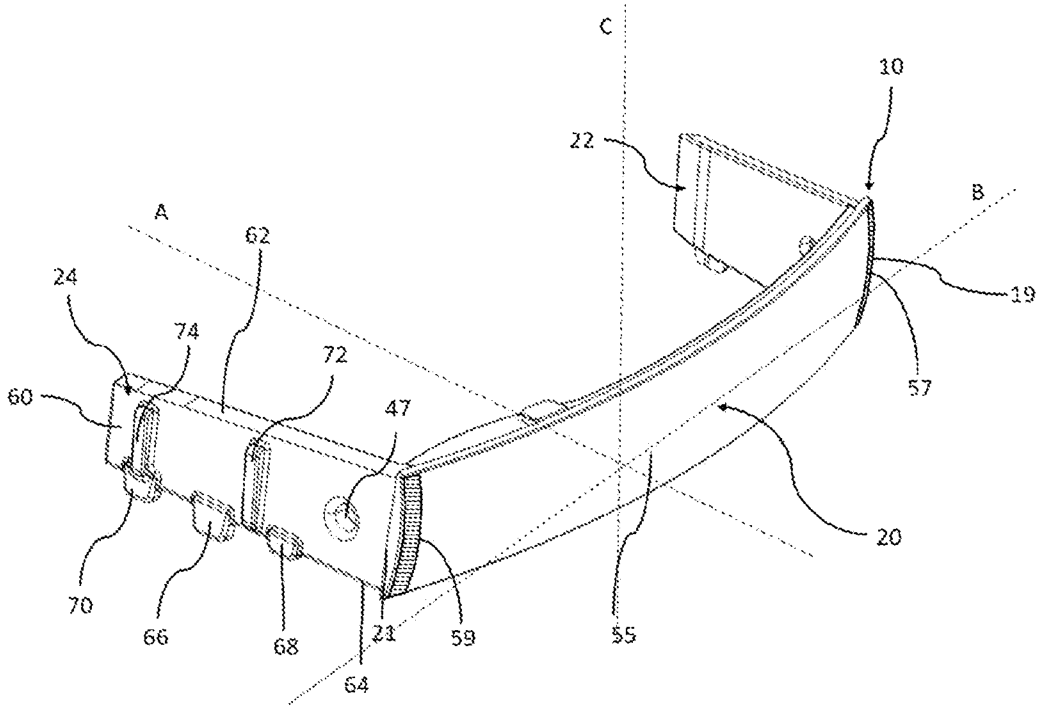
FIG. 4 is another view, at another perspective angle, of the optical element shown in FIG. 3.

The second attachment lug 24 extends, in the same way as the first attachment lug 22, perpendicularly to the transparent optical surface 20 at the second transverse end 21, as shown in FIG. 4. The second attachment lug also has a second outer face 60, a second inner face, not visible in FIG. 4, directed toward the first attachment lug, and a second upper face 62 and a second lower face 64.

The longitudinal dimension of the second attachment lug 24 is greater than the longitudinal dimension of the first attachment lug, which represents about 60% to 80% of the longitudinal dimension of the second attachment lug 24. As described below, this results in a greater number of positioning means, but it should be noted that this is not limiting on the invention and that the two attachment lugs could have equivalent longitudinal dimensions, depending on the configuration of the light module and of the support to which the optical element 10 is attached.

In the illustrated example, the second attachment lug 24 comprises a second positioning block 66, a second positioning stud 68 and a third positioning stud 70, as well as a second positioning rib 72 and a third positioning rib 74. These positioning means of the second attachment lug 24 have the same functional features as the corresponding positioning means of the first attachment lug 22. In other words, the second positioning block 66 is intended to position the optical element 10 with respect to the support along the longitudinal axis A, the positioning studs 68, 70 are intended to position the optical element 10 with respect to the support along the vertical axis C, and the positioning ribs 72, 74 are intended to position the optical element 10 with respect to the support along the transverse axis B. Here again, the illustrated arrangement positioning means, with the second positioning block 68, the second positioning rib 72, the second positioning block 66, the third positioning rib 74 and the third positioning stud 70 in sequence from the transparent optical surface to the free end of the second attachment lug, is not limiting on the invention.

The optical element, with the transparent optical surface 20 and the attachment lugs 22, 24 arranged perpendicularly at the transverse ends of this optical surface, is made in a single piece, thus forming a one-piece unit. Thus, when the attachment lugs 22, 24 are positioned and then secured in a position with respect to the support, the transparent optical surface 20 is also secured in this position.

Since the optical element is made in one piece, the attachment lugs 22, 24 consist of the same material as the transparent optical surface 20. The optical element 10 usually consists of glass or synthetic polymers such as polymethyl methacrylate (PMMA) or polycarbonate (PC).

In FIGS. 3 and 4, optically inactive areas of the transparent optical surface 20 are represented by hatching. Evidently, an area is optically inactive when none of the light rays originally emitted by a light source fixed to the support pass through it. The light beam output from the light module is formed by the passage of the light rays through an optically active area 55 of the transparent optical surface 20, and it should be noted that, according to the invention, the transparent optical surface 20 has an optically active area extending in its center over the whole vertical dimension of this transparent optical surface. Only the areas where the transparent optical surface joins the lateral lugs 22, 24 create, at the sides, a first inactive area 57 at the first transverse end 19, and a second inactive area 59 at the second transverse end 21. These areas of inactivity 57, 59 thus extend on the shorter sides of the rectangular shape formed by the transparent optical surface 20. Consequently, these inactive areas 57, 59 each represent about 1% to 5% of the total surface area of the transparent optical surface 20, whereas they could reach about 20% of the total surface area if the inactive areas extended on the longer sides of the rectangle. Thus it is advantageous in optical terms to have lateral attachment lugs 22, 24 arranged at the transverse ends of the transparent optical surface 20 according to the invention, in order to provide an optically active area 55 of about 90% to 98% of the transparent optical surface 20.

The optical element 10 is intended to interact with the support 8, the attachment lugs 22, 24 being housed in the housing 26, 28. The housings 26, 28 are thus arranged so as to provide the partial attachment of the attachment lugs 22, 24 along the various aforesaid axes. The housings 26, 28 will be described in detail after the description of the other components of the support 8.

Figure 5:
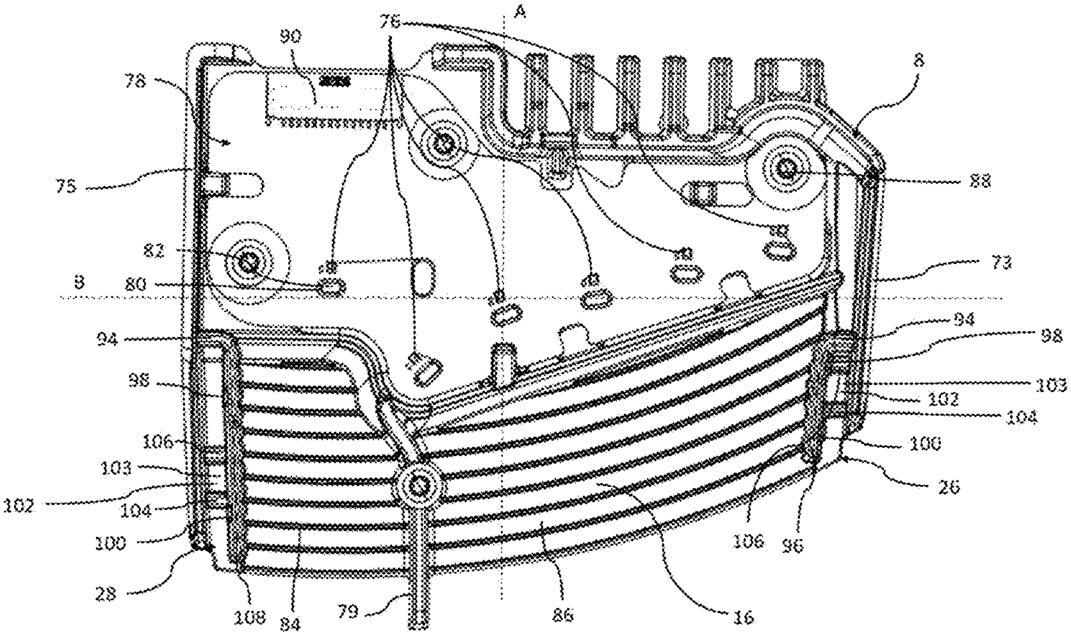
FIG. 5 is a top view of a support, which notably shows two housings for interacting with the attachment lugs of the optical element shown in FIGS. 3 and 4.
Figure 6:
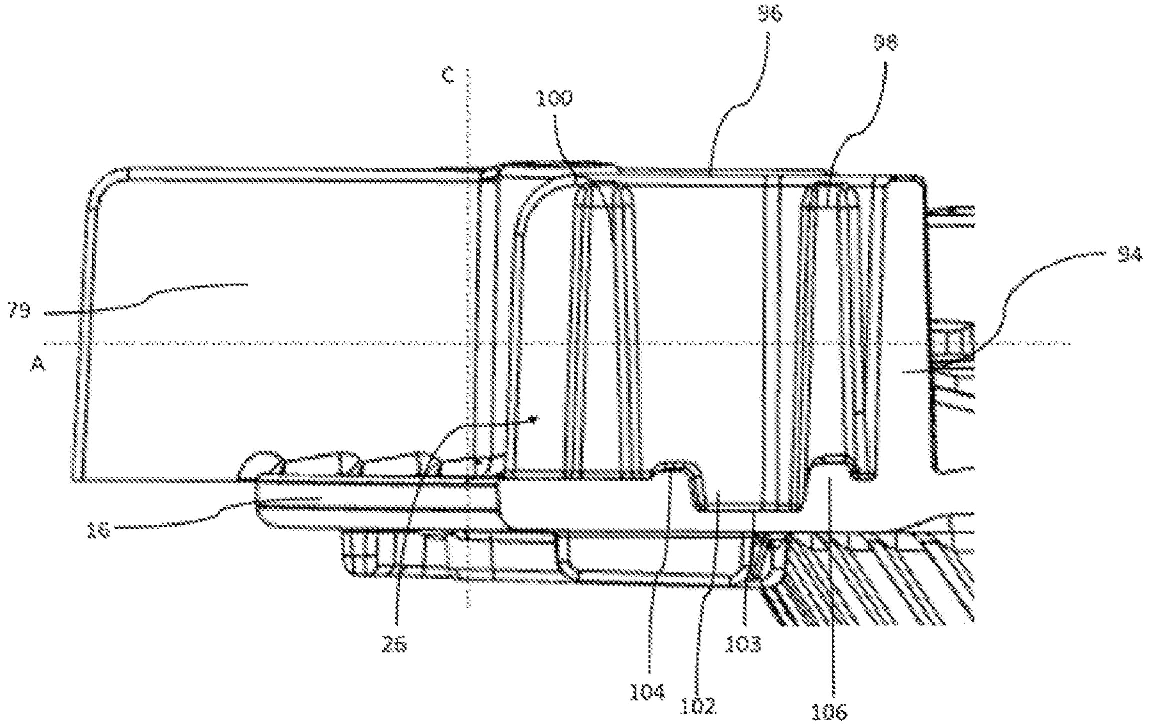
FIG. 6 is a longitudinal section through a housing of the support shown in FIG. 5.

The support 8, as shown in FIGS. 5 and 6, comprises the lower wall 16 which supports all the components of the support 8, and which extends transversely between a first longitudinal wall 73 and a second longitudinal wall 75, these walls 73, 75 forming a vertical projection of the lower wall 16 toward the optical element when the latter is mounted on the support.

The light module comprises a printed circuit board 78 fixed to the support 8, and more particularly to the lower wall 16 thereof. The printed circuit board 78 comprises a plurality of electrical tracks, not shown here, and at least one light source 76 for emitting light rays. In the illustrated example, the printed circuit board 78 has six light sources 76, substantially aligned with each other along the transverse axis B.

Near each light source 76, the printed circuit board has an oblong opening 80 for interaction with an indexing stud 82 of the support 8 to ensure the correct positioning of the printed circuit board. Here, the printed circuit board 78 thus comprises six oblong openings 80 and the support 8 comprises six indexing studs 82, each of the indexing studs 82 being housed in an oblong opening 80.

The support 8 has a separating wall 79 extending longitudinally and delimiting a first lighting space 84 and a second lighting space 86. The light rays from the light source 76 nearest to the second housing 28 of the support 8 are associated with a reflector having the purpose of guiding the rays toward the first lighting space 84, and of contributing to the formation of one type of light beam, for example a high beam, the other five light sources 76 being associated with one or more reflectors having the purpose of guiding the rays toward the second lighting space 86, and of contributing to the formation of another type of light beam, for example a low beam.

The printed circuit board 78 also comprises openings through which a clamping screw 88 is to be passed for attaching the printed circuit board 78 to the support 8. The printed circuit board 78 comprises an electronic module 90, configured, notably, for controlling the power supply to the light sources 76.

To make the following description easier to understand, the housings 26, 28 of the support 8 are arbitrarily defined as being positioned at the front of the support 8, and the electronic module 90 is arbitrarily defined as being located at the rear of the support 8 along the longitudinal axis A. According to this frame of reference, the six light sources 76 are arranged at the front of the printed circuit board 78.

The first housing 26 is delimited by the first longitudinal wall 73, a transverse wall 94 and a first inner wall 96. The transverse wall 94 is substantially perpendicular with respect to the first longitudinal wall 73 and the first inner wall 96, the first longitudinal wall 73 and the first inner wall 96 being substantially parallel to each other.

The first longitudinal wall 73, the transverse wall 94 and the first inner wall 96 extend projectingly from the lower wall 16 of the support 8, so that the lower wall 16 represents a bottom wall of the first housing 26.

In this first housing 26, two constricting ribs 98, 100 extend projectingly from the first inner wall 96 toward the inside of the first housing 26. Each constricting rib 98, 100 reduces the passage cross section of the first housing between the first longitudinal wall 73 and the first inner wall 96. The constricting ribs 98, 100 thus enable the optical element 10 to be positioned along the transverse axis B while being partially in contact with the first inner face of the first attachment lug 22 of the optical element 10, not shown in FIGS. 5 and 6. Each constricting rib 98, 100 extends substantially over the whole vertical dimension, as shown in FIG. 6, and its transverse dimension is such that the passage formed between the constricting rib and the first longitudinal wall 73 is equal to, or slightly smaller than, the transverse dimension of the first attachment lug that is to be housed in the first housing 26. Alternatively, a single constricting rib could be provided.

A groove 102 is formed in the bottom wall of the first housing 26 formed by the lower wall 16. The depth of the groove 102 along the vertical axis C tends to decrease as it approaches the bottom 103 of the groove 102. The groove 102 extends over the whole transverse dimension of the first housing, between the first longitudinal wall 73 and the first inner wall 96.

The groove 102 is longitudinally delimited by a first reinforcing bead 104, forming a projection from the bottom wall, which extends over the whole transverse dimension of the first housing 26, and by a second reinforcing bead 106, of similar shape, the first reinforcing bead 104 extending at the front of the groove and the second reinforcing bead 106 extending at the rear of this groove 102, according to the arbitrarily chosen frame of reference.

The second housing 28 has a structure substantially similar to that of the first housing, the second housing being intended to house the second attachment lug 24 of the optical element 10. Similarly, the second housing 28 is delimited by the second longitudinal wall 75, a transverse wall 94 and a second inner wall 108, the second housing being differentiated, notably, by its longitudinal dimension, which is greater than that of the first housing.

The second housing 28 comprises, in a similar manner to the first housing 26, a first constricting rib 98, a second constricting rib 100 and a groove 102 delimited longitudinally by reinforcing beads 104, 106, each of these elements having substantially the same configuration and the same features as those described above for the first housing 26.

The positioning of the attachment lugs 22, 24 of the optical element 10 in the housing 26, 28 of the support 8 will be described after the description of the general features of the reflector 12.

Figure 7:
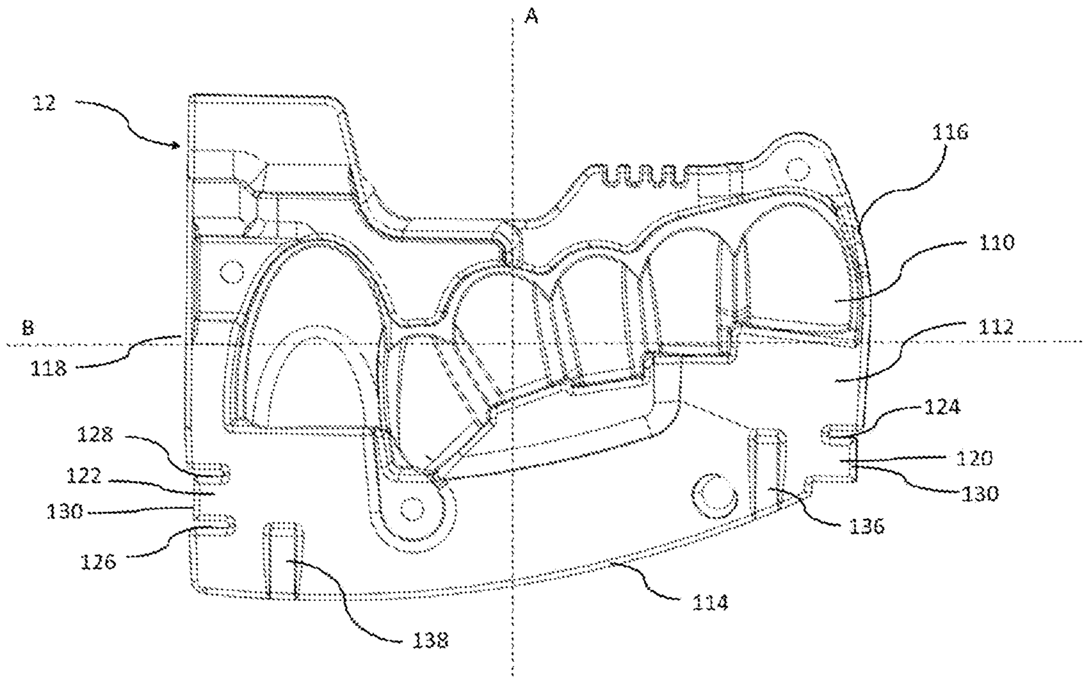
FIG. 7 is a top view of the reflector shown in FIG. 2.

As shown in FIG. 7, and as visible in FIG. 2, the reflector 12 is a one-piece element made in a single piece. This reflector 12 comprises a plurality of reflection cavities 110 for reflecting light rays, these cavities being six in number in this case. Each reflection cavity 110 is intended to be positioned directly over a light source 76 attached to the support 8. As mentioned above, the inside of the reflection cavity 110 may have a reflective surface whose shape is such that, when the corresponding light source is placed at the first focal point of this elliptical shape, the rays are reflected toward the transparent optical surface 20 of the optical element 10, whose focal point is arranged, for example, on the reflective surface of the reflection cavity.

The reflector 12 also comprises an upper wall 112 which is arranged in the extension of the walls delimiting the reflection cavities 110, and which is intended to cover the first lighting space 84 and the second lighting space 86 of the support 8 to close these spaces and allow the light rays to be routed within these lighting spaces. As illustrated, the upper wall 112 extends longitudinally from a front transverse edge 114, according to the arbitrarily chosen frame of reference, of the reflector 12 to the reflection cavities 110, and transversely between a first longitudinal edge 116 and a second longitudinal edge 118. The reflector 12 is configured to cover the first housing 26 at the first longitudinal edge 116, and the second housing 28 at the second longitudinal edge 118.

As shown in FIG. 7, the reflector comprises, on the upper wall 112, a first tab 120 and a second tab 122, each formed by a cut-out in one of the longitudinal edges 116, 118.

More particularly, the first tab 120 is delimited longitudinally toward the front by the front transverse edge 114, on the one hand, and toward the rear by a first rear slit 124. Consequently, the first tab 120 is, as shown in FIG. 7, joined to the upper wall 112 of the reflector by a substantially longitudinal junction, so that the first tab can flex, notably in a vertical direction about a substantially longitudinal axis.

The second tab 122 is of substantially equal size, and differs from the first tab only in that it is arranged at a distance from the front transverse edge 114. More particularly, the second tab 122 is delimited at the front, according to the arbitrarily chosen frame of reference, by a front slit 126, and at the rear by a second rear slit 128. The front slit 126 and the second rear slit 128 extend mainly along the transverse axis B over a substantially similar dimension.

Figure 8:
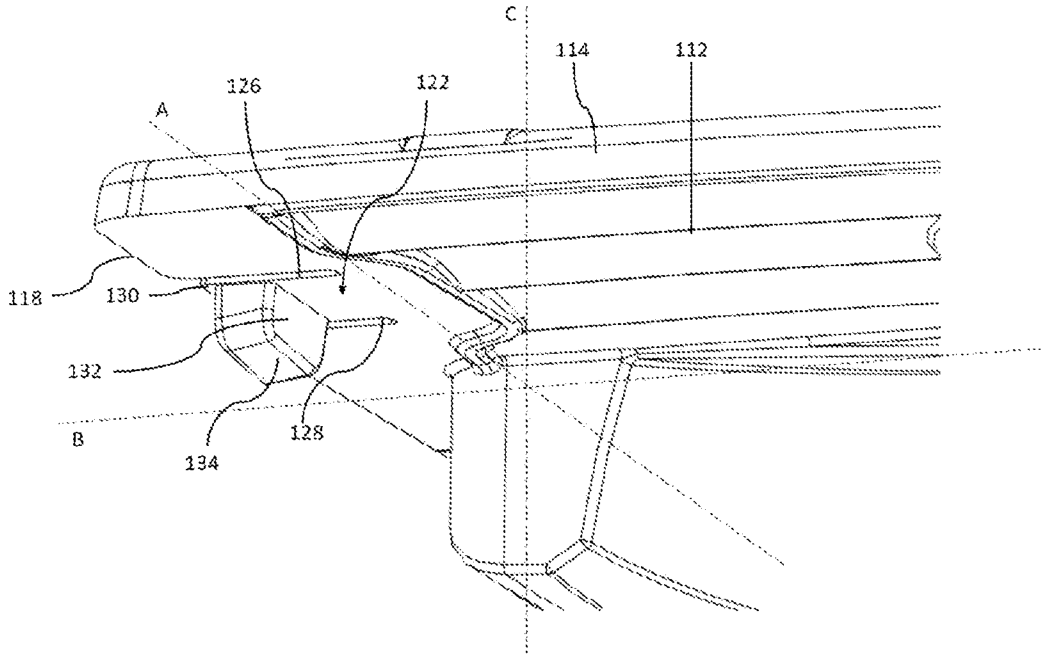
FIG. 8 is a perspective view, from below, of the reflector shown in FIG. 7, showing an elastically deformable tab comprising a bearing wall.

Each of the tabs 120, 122 of the reflector 12 has a free end 130, substantially aligned transversely with the corresponding longitudinal edge, and a bearing wall 132, as shown in FIG. 8, which perpendicularly extends each free end 130. Thus each tab forms an elastically deformable element, and the bearing wall arranged at the free end of the tab forms a contact finger capable of exerting pressure on the wall on which it bears, namely the corresponding attachment lug 22, 24.

The interaction of the attachment lugs 22, 24 of the optical element 10 with the support 8 and the reflector 12 will now be described with reference to FIGS. 9 and 10.

Figure 9:
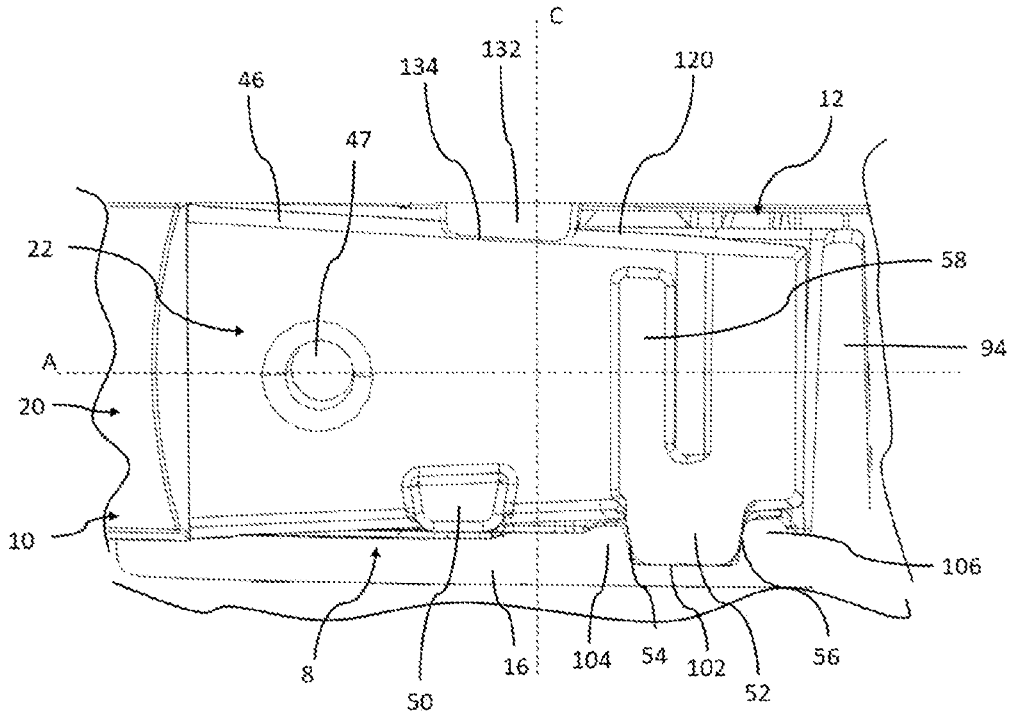
FIG. 9 is a sectional view in a longitudinal and vertical plane of the light module of FIG. 2, showing the interaction of the optical element according to FIG. 3 or 4, of the support according to FIG. 5 or 6, and of the reflector according to FIG. 7 or 8.
Figure 10:
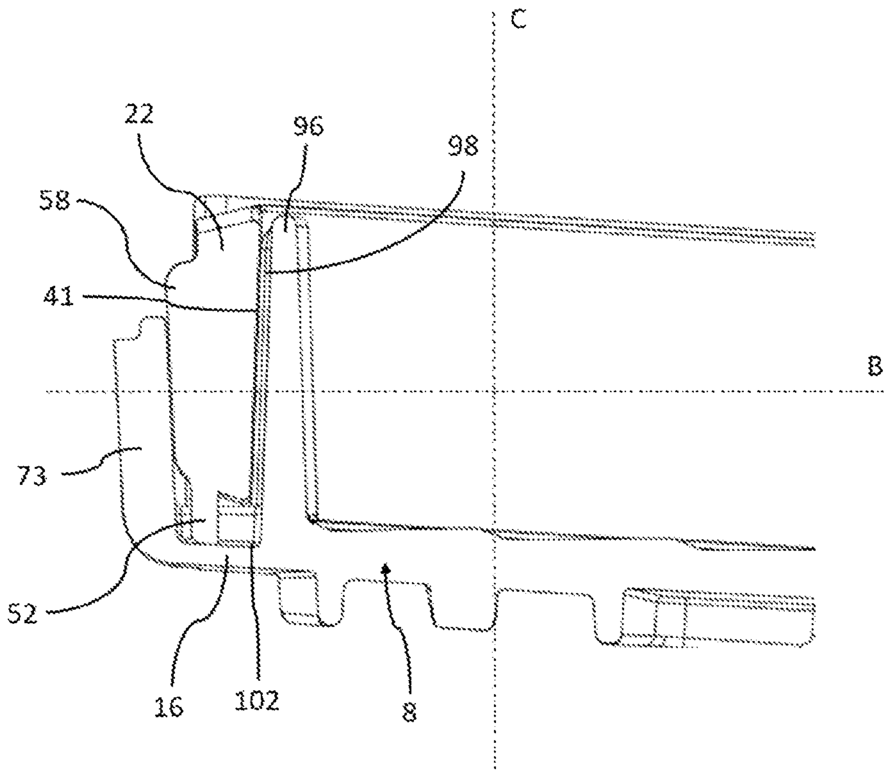
FIG. 10 is a sectional view in a vertical and transverse plane of the light module of FIG. 2, showing the interaction of the optical element according to FIG. 3 or 4 and of the support according to FIG. 5 or 6.

FIGS. 9 and 10 describe, more particularly, the interaction between the first housing 26 and the first attachment lug 22, it being understood that the features described above may also be applied to the similar interaction between the second housing 28 and the second attachment lug 24.

As mentioned above, the groove 102 is designed to house the first positioning block 52 of the first attachment lug 22, for the purpose of positioning the optical element 10 along the longitudinal axis A. More particularly, the first positioning block 52 is kept in the groove 102 by the abutment of the first and second bearing faces 54, 56 of this block on the transverse faces of the groove 102, the longitudinal dimension of the groove 102 between these transverse faces being equal to or slightly greater than the longitudinal dimension of the first positioning block 52.

FIG. 9 also shows how the optical element 10 is kept in its vertical position by, on the one hand, the contact of the positioning stud 50 of the first attachment lug 22 against the bottom wall of the first housing 26, and, on the other hand, the contact of the bearing wall 132 of the first tab 120 of the reflector 12 against the first attachment lug 122. The first attachment lug is thus clamped between the bottom of the first housing, and therefore the support 8, and a bearing end 134 of the bearing wall 132, and therefore of the reflector 12.

The property of elastic deformation of the tab carrying the bearing wall 132 ensures that the aforementioned double contact is present, regardless of the manufacturing and assembly tolerances. Thus, during the assembly of the light module, the reflector 12 is attached to the support 8 after the optical element 10 has been positioned in the support, with the attachment lugs placed in their respective housings. The bearing end 134 of the first tab 120 then comes into contact with the first upper face 46 of the first attachment lug 22. When the reflector 12 is attached to the support 8 by the plurality of clamping screws 88, the bearing end 134 of the first tab 120 enables the vertical position of the first attachment lug 22, and of the optical element 10 more generally, to be fixed by pushing the positioning stud 50 of the first attachment lug 22 against the lower wall 16 at the first housing 26.

FIG. 10 shows more particularly the positioning means for fixing the transverse position of the optical element, and notably the interaction of a constricting rib 98 with a face, in this case the first inner face 41 of the first attachment lug 22, and the interaction of a positioning rib 58 of the first attachment lug 22 with the inner face of the first longitudinal wall 73 which contributes to the delimiting of the first housing 26. The presence of these positioning and constricting ribs provides linear contacts between the attachment lug and the walls that transversely delimit the corresponding housing.

The interaction of the reflector 12 and the protective cover 14 will now be described.

The reflector 12, as shown in FIGS. 2 and 7, comprises on its upper wall 112 a first positioning spur 136 and a second positioning spur 138, for vertically positioning the protective cover 14 with respect to the reflector, and consequently with respect to the support and to the optical element.

These positioning spurs 136, 138 extend mainly along the longitudinal axis A from the front transverse edge 114, according to the arbitrarily chosen frame of reference, of the reflector 12. Each of the positioning spurs 136, 138 forms a vertical projection of the upper wall 112, here extending in the opposite direction from the support 8 when the module is assembled. The vertical dimension of the projection formed by each of the positioning spurs 136, 138 is variable, and increases with its distance from the front longitudinal edge 114.

Figure 11:
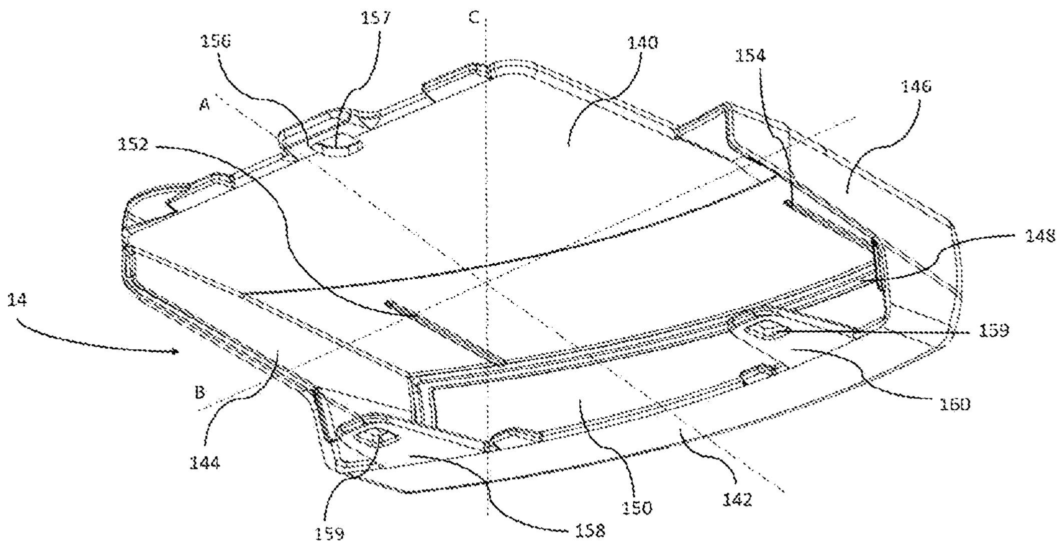
FIG. 11 is a perspective view of the protective cover shown in FIG. 2.

The positioning spurs 136, 138 each interact with a retaining rib 152, 154 of the protective cover 14, visible in FIG. 11. The retaining ribs of the protective cover 14 and their interaction with the positioning spurs 136, 138 will be described after the following description of the set of components of the protective cover 14.

As shown in FIG. 11, and as may have been described above, the protective cover 14 comprises at least an upper protective wall 140, a lower protective wall 142, a first longitudinal protective wall 144, a second longitudinal protective wall 146, and a front wall 148. The upper protective wall 140 and the lower protective wall 142 each extend in a longitudinal and transverse plane, and the first longitudinal protective wall 144 and the second longitudinal protective wall 146 each extend in a longitudinal and vertical plane. The front wall 148, for its part, extends perpendicularly to each of the protective walls of the protective cover, in a transverse and vertical plane.

The protective cover 14 is designed to cover the support 8, the optical element 10 and the reflector 12 when the light module is assembled. In this context, the front wall 148 comprises an opening 150 whose dimensions correspond to the length and height of the transparent optical surface 20 of the optical element 10. The front wall, with its opening 150, thus takes the form of a frame, which is arranged at the front longitudinal end of the protective walls of the protective cover 14 and which can surround the transparent optical surface 20.

The protective walls of the protective cover 14 can, notably, be made of an opaque material, so that the positioning of these walls around the support 8 blocks the leakage of light through any areas other than through the opening 150 in the front wall 148, that is to say through the transparent optical surface 20.

As mentioned above, the upper opaque wall 140 of the protective cover 14 comprises a first retaining rib 152 and at least a second retaining rib 154 arranged on an inwardly oriented face of the protective cover 14. The retaining ribs 152, 154 extend along the longitudinal axis A from the front of the protective cover 14, according to the arbitrarily chosen frame of reference, that is to say from an inner face of the front wall. The retaining ribs 152, 154 are arranged to interact with the positioning spurs 136, 138 of the reflector 12.

More precisely, during the assembly of the light module, and notably when the protective cover is attached around the support, the optical element and the reflector, each of the retaining ribs 152, 154 bears, respectively, on the corresponding positioning spur 136, 138, thus fixing the position of the protective cover 14 along the vertical axis C. Evidently, the vertical positioning of the protective cover 14 must be precise, to ensure that the transparent optical surface through which the light rays leave the light module is not partially blocked by the frame formed by the front wall 148.

The protective cover 14 is attached to the support 8 by an upper attachment means 156 and two lower attachment means 158, 160, interacting with the attachment elements formed on the support 8. The attachment elements of the support 8 will be described after the following description of the attachment means of the protective cover 14.

The upper attachment means 156 consists of an upper elastically deformable tab. The upper elastically deformable tab 156 longitudinally extends the upper protective wall 140 toward the rear of the protective cover 14, according to the arbitrarily chosen frame of reference. Additionally, the upper elastically deformable tab 156 is here centered transversely on the upper protective wall 140. The upper elastically deformable tab 156 has an upper aperture 157 for interaction with an upper attachment element of the support 8.

The lower attachment means 158, 160 of the protective cover 14 are here formed by a first lower elastically deformable tab 158 and a second lower elastically deformable tab 160, each of which extends the lower protective wall 142 along the longitudinal axis A, toward the rear of the protective cover 14, according to the arbitrarily chosen frame of reference. Each of the lower elastically deformable tabs 158, 160 comprises a lower aperture 159 for interaction with a lower attachment element of the support 8.

Figure 12:
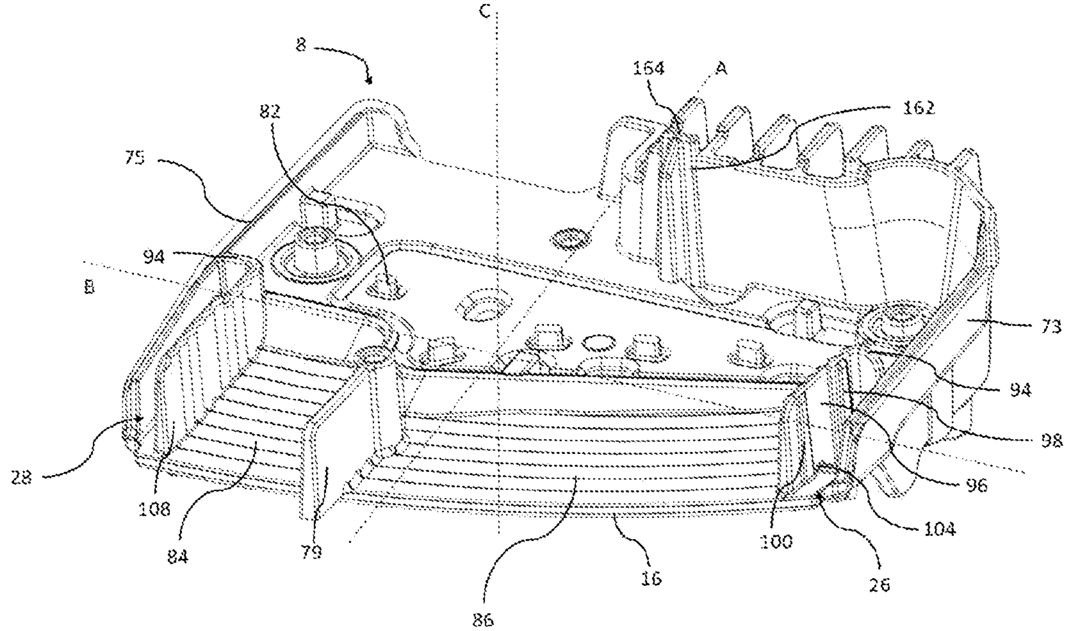
FIG. 12 is a perspective view of the support as illustrated in FIGS. 5 and 6.

As shown in FIG. 12, the support 8 comprises an upper attachment element 162, taking the form of an attachment lug. This attachment lug 162 extends mainly along the vertical axis C from the lower wall 16 to an abutment end 164. This abutment end 164 is intended to interact with the upper elastically deformable tab 156 of the protective cover 14, said abutment end 164 being capable of being housed in the upper aperture 157 of the upper elastically deformable tab 156 when the light module is assembled.

Figure 13:
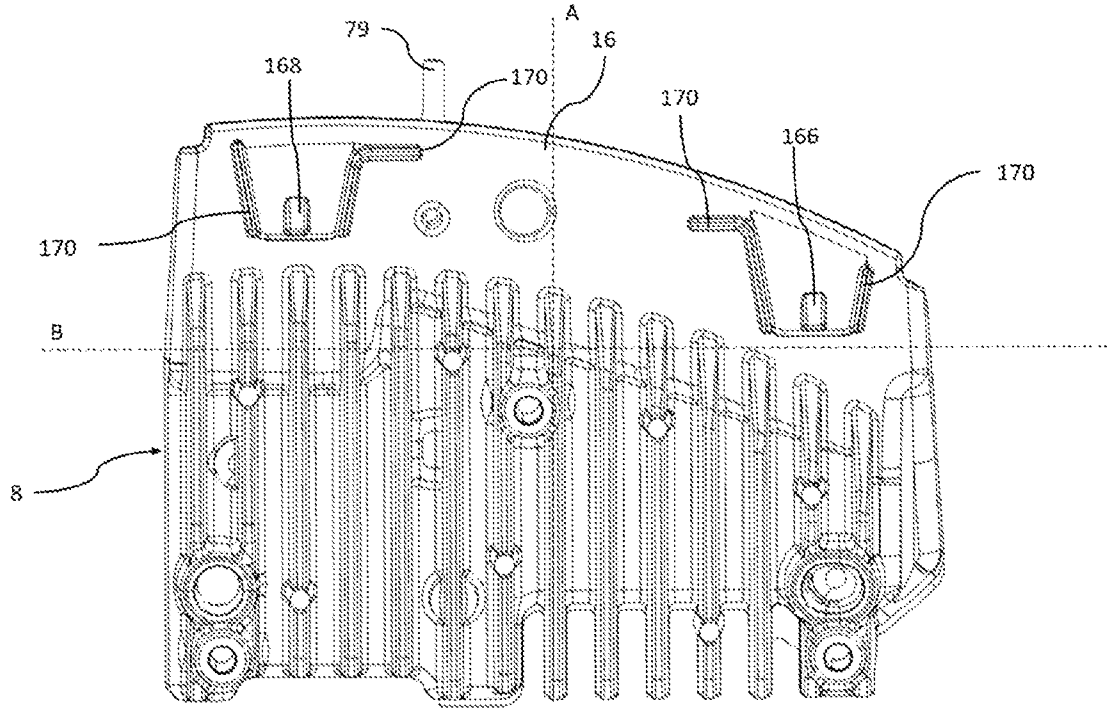
FIG. 13 is a view from below of the support of FIG. 12.

Additionally, as shown in FIG. 13, the support 8 comprises, on an outer face of the lower wall 16, that is to say a face turned in the opposite direction from the optical element 10 when the light module is assembled, a first attachment means 166 and a second attachment means 168. Each attachment means can be housed in a corresponding lower aperture 159.

To facilitate the mounting of the protective cover 14, and notably to ensure that the attachment means are guided toward the corresponding apertures, the support 8 has guide ribs 170 on the outer face of the lower wall 16 on either side of the attachment means 166, 168. The guide ribs 170 are designed to provide precise guidance of the lower elastically deformable tabs 158, 160 toward the attachment means 166, 168. When in position, the lower elastically deformable tabs 158, 160 are retained transversely by these guide ribs 170.

When each of the attachment means is housed in the corresponding aperture, the protective cover 14 is kept in position with respect to the support, thus fixing the position of the reflector and of the optical element against the support.

As detailed above, the invention provides, in particular, for the attachment of an optical element to a light module support, with few or no negative effects on the size of the active area of the transparent optical surface, that is to say the area through which the light rays emitted by at least one light source of the light module can pass. The particular configuration of the optical element with attachment lugs arranged transversely to the optical element, that is to say at the ends of the largest dimension of the optical element, improves the optical performance of light modules and of vehicles equipped with light modules according to the invention, while allowing simple assembly with the attachment of the optical element by the clamping of its lateral attachment lugs between a support on the one hand and a reflector and protective cover on the other hand.

What is claimed is:

1. An optical element of a light module for a vehicle, the light module comprising at least one light source, the rays emitted from which pass through a transparent optical surface of the optical element and emerge in the form of a light beam, the transparent optical surface extending mainly along a transverse axis between a first transverse end and a second transverse end, at least one support for the at least one light source and for the optical element, and a reflector attached to the support to deflect the light rays emitted by the light source toward the optical element, wherein the optical element includes at least one means for attachment to the light module at each of the transverse ends of the transparent optical surface and to the at least one support with each of the at least one means for attachment having at least one surface in a plane parallel to the transverse axis and the reflector positioned to cover each of the at least one surface.

2. The optical element as claimed in claim 1, wherein the attachment means is an attachment lug extending substantially perpendicularly to the transparent optical surface along a longitudinal axis.

3. The optical element as claimed in claim 1, wherein the attachment means of the optical element and the transparent optical surface of the optical element form a one-piece element.

4. A light module, comprising:

a housing;

at least one light source;

an optical element, the optical element includes a transparent optical surface extending mainly along a transverse axis between a first transverse end and a second transverse end, wherein the optical element includes at least one means for attachment to the light module at each of the transverse ends of the transparent optical surface with each of the at least one means for attachment having at least one surface in a plane parallel to the transverse axis;

at least one support for the at least one light source and for the optical element;

a reflector attached to the support to deflect the light rays emitted by the light source toward the optical element with the reflector positioned to cover each of the at least one surface; and wherein beams emitted from the at least one light source pass through the transparent optical surface of the optical element and emerge in the form of a light beam.

5. The light module as claimed in claim 4, wherein the support has a portion for each attachment means of the optical element.

6. The light module as claimed in claim 5, wherein the attachment means include at least one positioning block of the optical element capable of interacting with a groove formed in a wall of the housing to position the optical element with respect to the support along the longitudinal axis, or at least one positioning stud of the optical element capable of bearing on a wall of the housing to form an abutment for the vertical positioning of the optical element with respect to the support along a vertical axis perpendicular to the longitudinal axis and to the transverse axis.

7. The light module as claimed in claim 6, wherein the at least one positioning block of the optical element and the at least one positioning stud are formed on the same face of the attachment means.

8. The light module as claimed in claim 7, wherein each attachment means includes an inner face oriented toward the inside of the light module, an outer face oriented toward the outside of the light module, an upper face and a lower face connecting the inner and outer faces, the lower face being positioned facing a bottom wall of the housing, and wherein the at least one positioning block of the optical element and the least one positioning stud are formed on the lower face of the attachment means, the groove being capable of interacting with the bottom wall of the housing.

9. The light module as claimed in claim 8, wherein the housing is delimited transversely by a longitudinal wall and an inner wall which project from the support, wherein the outer face or the inner face of the attachment means includes at least one positioning rib for positioning with respect to the support, which rib can bear on one of the walls delimiting the corresponding housing to position the optical element with respect to the support along the transverse axis.

10. The light module as claimed in claim 8, wherein the housing is delimited transversely by a longitudinal wall and an inner wall which project from the support, wherein the outer face and the inner face of the attachment means includes at least one positioning rib for positioning with respect to the support, which rib can bear on one of the walls delimiting the corresponding housing to position the optical element with respect to the support along the transverse axis.

11. The light module as claimed in claim 5, wherein the optical element is positioned so as to be cantilevered from the support of the light module.

12. The light module as claimed in claim 5, wherein each of the attachment means of the optical element are positioned in a portion of the support.

13. The light module as claimed in claim 12, wherein the reflector includes at least one elastically deformable tab in contact with one of the attachment means of the optical element, so as to immobilize said attachment means in the corresponding housing along the vertical axis.

14. The light module as claimed in claim 12, further comprising a protective cover configured to be attached to the support so as to surround at least the reflector and the attachment means of the optical element, wherein the reflector includes at least one spur configured to interact with a wall of the protective cover, or the protective cover includes at least one retaining rib configured to interact with a wall of the reflector.

15. The light module as claimed in claim 12, further comprising a protective cover configured to be attached to the support so as to surround at least the reflector and the attachment means of the optical element, wherein the reflector includes at least one spur configured to interact with a wall of the protective cover, and the protective cover includes at least one retaining rib configured to interact with a wall of the reflector.

16. The light module as claimed in claim 5, wherein the attachment means include at least one positioning block of the optical element capable of interacting with a groove formed in a wall of the housing to position the optical element with respect to the support along the longitudinal axis, and at least one positioning stud of the optical element capable of bearing on a wall of the housing to form an abutment for the vertical positioning of the optical element with respect to the support along a vertical axis perpendicular to the longitudinal axis and to the transverse axis.

* * * * *